Figure 1:
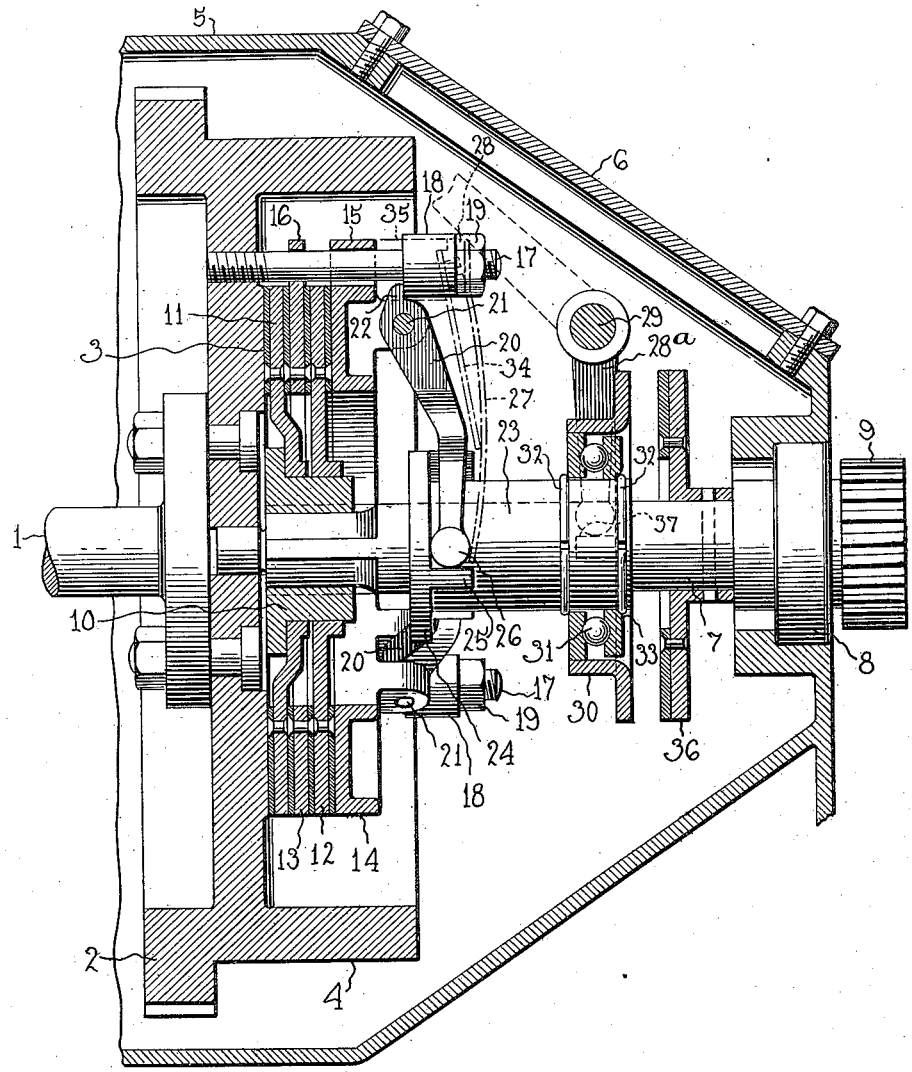

S. M. D. MILLER.
CLUTCH.
APPLICATION FILED JULY 28, 1917.

1,279,137.

Patented Sept. 17, 1918.
2 SHEETS—SHEET 1.

Witnesses
Arthur F. Draper
Chas. W. Stauffiger

Inventor
Samuel M.D. Miller
By
Attorneys

S. M. D. MILLER.
CLUTCH.
APPLICATION FILED JULY 28, 1917.
1,279,137.
Patented Sept. 17, 1918.
2 SHEETS—SHEET 2.
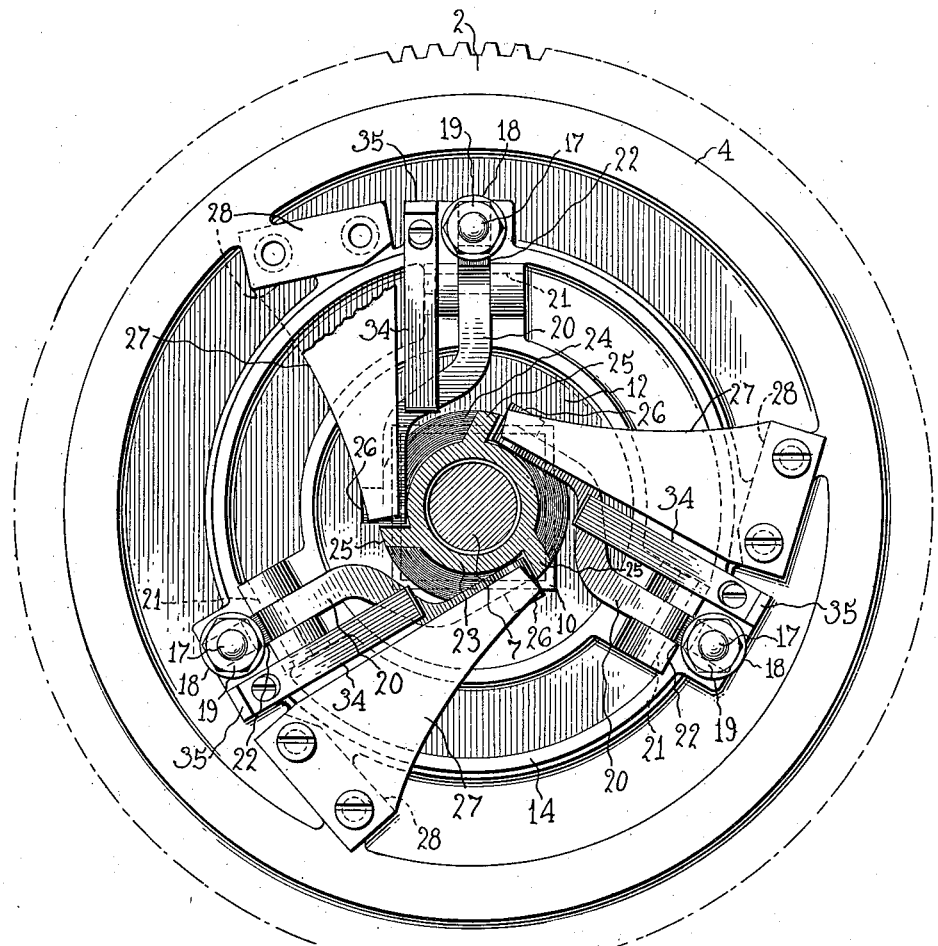
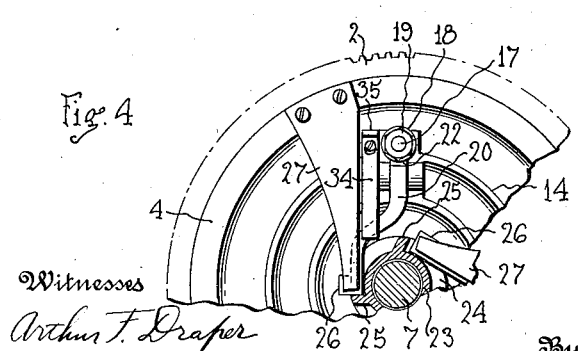
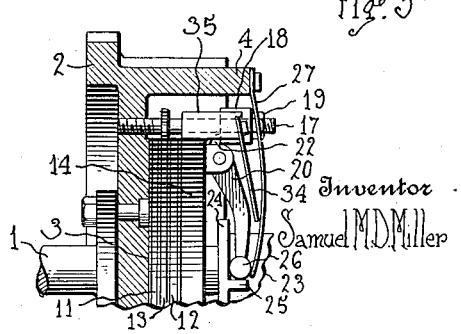

UNITED STATES PATENT OFFICE.

SAMUEL M. D. MILLER, OF DETROIT, MICHIGAN.

CLUTCH.

1,279,137.  Specification of Letters Patent.  Patented Sept. 17, 1918.

Application filed July 28, 1917. Serial No. 183,219.

*To all whom it may concern:*

Be it known that I, SAMUEL M. D. MILLER, citizen of the United States of America, residing at Detroit, in the county of Wayne and State of Michigan, have invented certain new and useful Improvements in Clutches, of which the following is a specification, reference being had therein to the accompanying drawings.

This invention relates to a friction clutch especially adapted for motor vehicles, and its object is to secure a device which is very efficient in operation, simple in construction and easy to operate, and further to provide a unitary structure which may be applied to a plane surface of one member to transmit motion to another in axial alinement therewith and is arranged to give an even engagement of its friction members, insuring smoothness of operation and preventing slippage when fully engaged. It is also an object of the invention to provide an arrangement of parts giving simplicity and compactness of construction, and providing other novel features particularly adapting the same to the use to which it is put and cheapening the manufacture.

With these and other ends in view the invention consists in the matters hereinafter more fully set forth and particularly pointed out in the appended claims, reference being made to the accompanying drawings, in which—

Figure 1 is a longitudinal vertical section through a device illustrative of the invention;

Fig. 2, a sectional end view of the same removed from its casing;

Fig. 3, a sectional detail view showing a slightly modified construction drawn to a reduced scale; and Fig. 4 is an end elevation of the same.

As shown in the drawings, 1 represents a driving shaft which may be the crank shaft of an engine, and 2 is a suitable fly wheel secured thereon having a web portion with a plane annular face 3 at its rear side and an overhanging flange 4. A suitable inclosing casing 5 is shown, which casing may be the rear end of the crank case of an engine in a motor vehicle construction and to the rear end of which casing a change speed transmission casing (not shown) may be secured, a suitable hand hole and cover 6 therefor being provided in the upper side of the casing. A driven shaft 7 has a bearing at its forward end in an axial recess in the fly wheel and a bearing 8 is provided for the rear end of said shaft in the rear end of the casing. A gear 9 which may be one of the gears of the change speed mechanism, is secured to the rear end of the shaft 7 outside the casing 5. A hub 10 is mounted upon the forward end of the shaft 7 adjacent the fly wheel to turn with the shaft and move freely in a longitudinal direction thereon, and on a squared portion of this hub is a pair of friction disks 11 and 12 turning with the hub and shaft and having a longitudinal movement thereon. The disk 11 is faced with a suitable friction material to engage the annular plane surface 3 of the fly wheel and interposed between the disks 11 and 12 is a friction ring 13 also faced with friction material to engage the two disks.

A master ring 14 is provided to engage the rear face of the disk 12 and this ring, and the friction ring 13, are provided with ears 15 and 16 respectively, having holes therein to receive stud bolts 17 which are tapped into the web of the fly wheel and extend adjacent to the edges of the friction disks. These stud bolts form guides for the friction ring and master ring to hold the same centered relative to the friction disks and permit a free movement of the rings thereon when the master ring is forced toward the fly wheel face to clamp the disks and rings. Each stud bolt is provided with a sleeve member 18 and an adjusting nut 19 on its outer end, and a series of levers 20, one for each stud bolt, is pivoted at 21 between ears on the master ring, and each lever is provided with a lug 22 to engage beneath the inner end of the adjacent sleeve 18 on its stud bolt.

Slidable longitudinally upon the driven shaft 7 is an operating sleeve 23 and this sleeve is provided at its inner end with a flange 24 having integral lugs 25 extending longitudinally of the sleeve, one lug for each of the lever arms 20, which arms extend radially inward for a distance and then are curved laterally to lie alongside the sleeve 23, and each is provided with a round end or head 26 to lie against the outer side of the flange 24 and engage one side of one of the lugs 25.

A flat leaf spring 27 is rigidly secured at its outer end to a lug 28 projecting from the web of the fly wheel, or as shown in Figs. 3 and 4, secured rigidly to the rim or flange 4 of the fly wheel, one of these springs being provided for each of the levers 20 with the free end of the spring lying upon the outer side of the head 26 of the lever. The springs thus act to normally turn the levers inwardly and by reason of the engagement of their lugs 22 beneath the sleeves 18 on the stud bolts 19, force the master ring inwardly to frictionally clamp the disks 11 and 12 between it and the face of the fly wheel, and also clamp the friction ring 13 between the disks. The sleeve 23 is positively rotated in one direction, by the engagement of the end of the levers 20 with the lugs 25 on the sleeve.

To move the sleeve 23 longitudinally on the driven shaft 7 in opposition to the springs 27. the usual foot lever 28ª which is pivoted at 29 on the casing 5, is provided, the end of said lever engaging a flanged collar 30 mounted on the sleeve, said collar being provided with a pin 37 to engage the end of the lever and hold the collar against rotation, and an anti-friction bearing 31 being interposed between the collar and sleeve. The sleeve is thus free to turn independently of the collar so that there will be no frictional rubbing engagement between the lever 28 and the collar, and this bearing 31 is preferably held in place upon the sleeve by providing the sleeve with spaced circumferential grooves to receive a pair of split rings 32 which are slipped into the grooves and hold the bearing members against longitudinal movement on the sleeve, the outer bearing member being cut away at its outer side to form an inclined surface 33 at the inner angle of the rear side of the bearing member. The outer ring 32 is engaged by this angular surface and as the space between the rings is less than the length of the bearing, the outer ring engages the inclined surface 33 at all times, which surface overlying the ring, forces the ring into its groove and prevents its disengagement therefrom. It is the usual practice to secure this anti-friction bearing upon the sleeve by means of a screw thread but it has been found that the hardened screw thread of the bearing member will soon cut away the soft thread of the sleeve and the bearing will become loose. By fastening the bearing in place by means of the split rings 32, the same is securely held in place upon the sleeve without wear and consequent danger of its coming loose, and the bearing may be readily detached at any time.

When the sleeve 23 is moved outwardly against the action of the springs 27 to take the pressure of these springs from the master ring and permit a disengagement of the clutch so that the fly wheel may turn freely independently of the driven shaft, it is desirable that means be provided for moving the master ring away from and out of engagement with the disk 12, insuring a disengagement of the friction members which might otherwise stick and continue to drive the driven shaft. To provide for such disengagement of the master ring, springs 34 are secured at their outer ends to lugs 35 on the periphery of the master ring, one of such lugs being provided adjacent each ear 15 thereon, Each of these springs 34 extends inwardly with its inner end adjacent the outer side of one of the levers 20. When the clutch is fully engaged as shown in Fig. 1, with the sleeve 23 at the limit of its inward movement, the inner ends of the springs 34 are just out of engagement with the levers 20, but when the sleeve is moved outwardly against the action of the springs 27 to disengage the clutch, these arms 20 come into contact with the springs 34 and exerting a pressure thereon, cause the master ring to be carried outwardly with the sleeve, thus insuring the disengagement of the clutch by means of the outward force on the yielding springs 34 which are rigidly secured to the master ring.

In a motor vehicle driving mechanism it is found that when the clutch is disengaged prior to shifting the gears of the transmission mechanism to change the speed, the momentum of the driven shaft and the gears of the transmission mechanism cause them to continue to spin for a short time, and when the gears are shifted, the teeth clash by reason of the spinning movement, causing noise and wear of the teeth. It has therefore been found expedient to provide a suitable brake for the driven shaft which will be brought into operation whenever the clutch is fully disengaged, to retard the rotation of the shaft and gears of the transmission mechanism connected therewith. To provide such a brake which will be simple in construction and easily installed in connection with the clutch mechanism, a disk 36 is secured upon the driven shaft 7 adjacent the bearing 8 and in a position to be engaged by the collar 30 when this collar and the sleeve 23 is moved rearwardly to the limit of its movement in disengaging the clutch. The collar coming into engagement with a friction surface on the disk 36 puts a brake upon the driven shaft 7, stopping its rotation and also the rotation of the transmission gears so that these gears may be engaged without causing them to clash.

By providing a separate spring 27 for each of the levers 20, these levers are independently operated and thus separate force is applied to the master ring at several different points to force it into frictional contact with the friction members and an even engagement of these members may thus be secured as each of the levers 20 is separately adjustable by its adjusting nut 19 to vary its throw according to the strength of its individual spring. Where a single spring is used to operate a series of engaging levers, said spring may bear with much more force upon one lever than upon another and this pressure upon the master ring will not be even and a smooth even engagement of the clutch will not be secured. Upon wear of the friction disks and rings, the tension of the springs may be readily adjusted by removing the cover plate 6 and turning the adjusting nuts 19.

It will be noted that the arrangement of the springs 34 is such that they are inoperative when the clutch is engaged and become operative only after a short movement of the sleeve 23 has taken place in the operation of disengaging the clutch, and thus these springs do not interfere with the normal operation of the engaging springs 27.

By the use of an individual spring for operating each lever 20, these springs may be of such a form that they are carried near the master ring and thus take up a minimum space in the direction of the length of the clutch, which arrangement permits of the shortening of the overall length of the device, and particularly adapts it to motor vehicle construction.

The construction also permits of the application of the clutch to a fly wheel of any desired diameter having a plane surface into frictional contact with which the friction disks may be brought and the clutch may be readily applied by simply tapping into the web of the fly wheel and securing the stud bolts therein.

Obviously, changes in the details of construction may be made without departing from the spirit of my invention and I do not care to limit myself to any particular form or arrangement of parts.

What I claim is:—

1. In a device of the character described, the combination with friction members and a plurality of power members each comprising a lever pivoted intermediate its ends to form a long and a short arm for forcing said friction members into frictional engagement, of separate power means engaging the long arm of each lever near its free end for separately operating each of said power members to force the friction members into frictional engagement.

2. In a device of the character described, the combination with friction members and a plurality of power members each comprising a lever pivoted intermediate its ends to form a long and a short arm for forcing said friction members into frictional engagement, of a separate power spring engaging each lever near the free end of its long arm for operating each power member to force the friction members into frictional engagement.

3. In a device of the character described, the combination with a plurality of friction members and a plurality of power levers each pivoted intermediate its ends to form a long and a short arm and arranged with their short arms to exert a force upon one of the friction members at different points, of a spring for the long arm of each lever for separately operating the same to force the friction members into frictional engagement, and means for simultaneously engaging the long arms of the levers and moving all of said levers against the action of said springs.

4. In a device of the character described, the combination with a driving member and a driven member, of a friction member operatively connected to one of the members and movable toward and from the other member, of a plurality of levers each pivoted intermediate its ends to form a long and a short arm for moving the movable friction member, and a separate spring for independently engaging the long arm of each lever near its free end to move the movable friction member into frictional position to transmit motion from the driving to the driven member.

5. In a device of the character described, the combination with a driving member and a driven member, of a friction member operatively connected to one of the members and movable toward and from the other member, of a plurality of pivoted levers for moving the movable member, power means for turning said levers to move the movable member into operative position, and a resilient member for each lever connected to said movable friction member and arranged in the path of movement of said levers to be engaged thereby upon movement of said levers against the action of said power means.

6. In a device of the character described, the combination with a driving and a driven member, and a friction member to operatively connect said members, of power means for moving said friction member into operative position, and means connected to said friction member and arranged in the path of travel of said power means and normally out of engagement therewith, to be engaged by said power means for moving said friction member into inoperative position when said member is released by said power means.

7. In a friction clutch, the combination with a driving member and a driven member, and a friction member for operatively connecting said members, of a plurality of levers pivotally carried by said friction member, a spring for each lever carried by said friction member and arranged to yieldingly move said friction member out of operative position when the levers are moved in one direction, and means for operating all of said levers.

8. In a friction clutch, the combination with a driving member and a driven member, and a friction member for operatively connecting said members, of a plurality of levers pivotally attached to said friction member, a stud bolt on the driving member adjacent each lever and extending transversely of the periphery of the friction member adjacent thereto, an abutment member slidable longitudinally upon each bolt for engaging each lever, means on each bolt for adjusting the abutments, and means for operating said levers.

9. In a friction clutch, the combination of a driving member having a plane surface, a driven member in axial alinement with the driving member, a friction member movable toward and from the plane surface of the driving member, a plurality of levers pivotally mounted on the friction member, stud bolts on the driving member arranged around the friction member adjacent to and extending across its periphery, means slidable longitudinally upon each stud bolt forming abutments for the short arm of said levers, a spring secured at one end to the friction member adjacent each bolt and adapted to engage the long arms of the levers and means for moving said levers in opposition to said springs.

10. In a friction clutch, the combination with a driving member and a driven member, and a friction member for operatively connecting said members, of a plurality of levers pivoted intermediate their ends to form long and short arms for operating said friction member, a plurality of flat springs, one for each lever, rigidly secured at one end to said friction member with its free end adapted to engage the long arm of one of the levers, and means for turning said levers against the action of said springs.

11. In a friction clutch, the combination with a driving member and a driven member, and a friction member for operatively connecting said members, of a plurality of levers for operating said friction member, means for operating said levers to move the friction member to operative position, and a plurality of springs on said friction member, one for each lever and adapted to engage said lever when said levers are operated to release the friction member.

12. In a friction clutch, the combination with a driving member and a driven member, of a friction member, a plurality of levers for operating said friction member, a flat spring rigidly supported at one end to engage said levers at their opposite ends, and a plurality of flat springs rigidly secured to said friction member at one end with their free ends in the path of movement of said levers, and means for operating said levers against the action of said springs.

13. In a friction clutch, the combination of a driving member having a plane surface, a driven member in axial alinement with the driving member, a friction disk on the driven member, studs on the driving member adjacent the edge of the friction disk, a friction ring guided by said studs and movable toward and from said disk, a plurality of levers pivotally connected to said ring intermediate their ends to form long and short arms, an abutment slidable on each stud for engaging the short arms of the levers, a separate spring for engaging the long arm of each lever to move the levers in one direction, means carried by the ring arranged in the path of the levers for moving said ring into inoperative position and a sleeve on the driven member for simultaneously moving said levers against the action of said springs.

14. In a clutch, the combination of a driving member, a driven member in axial alinement therewith, a friction member movable toward and from the driving member, means for moving said friction member, a sleeve on the driven member for operating said means, said sleeve being provided with spaced circumferential grooves, an antifriction member mounted on the sleeve between said grooves, split rings in the grooves engaging the bearing member and preventing relative longitudinal movement between the sleeve and member, and means on the bearing member for operating the sleeve longitudinally.

15. In a friction clutch, the combination of a friction member, a driven member in axial alinement therewith, friction means for operatively connecting said members, power members for operating the friction means, a sleeve on the driven member for operating the power members, said sleeve being provided with spaced circumferential grooves, a bearing member mounted on the sleeve between said grooves and having a surface at one side thereof inclined to the surface of the sleeve, a split ring in one of the grooves in engagement with said inclined surface, a split ring in the other groove in engagement with one side of the bearing member, and a non-rotatable member carried by the bearing member and to which power is adapted to be applied for moving the sleeve longitudinally.

16. In a friction clutch, the combination with a driving member having a plane surface, a driven member in axial alinement with the driving member, friction members carried by the driving and driven member opposite said surface, a master ring to oppose the friction members, studs on the driving member extending outwardly therefrom adjacent the edges of the friction members and ring and forming a guide for the ring, a plurality of inwardly extending levers pivotally connected to the ring, intermediate their ends, an abutment slidable upon each stud for engaging the outer ends of the levers, means on the studs for adjusting the abutments, a spring for each lever to engage the long arm thereof and independently operate said levers and move the ring toward the friction members, a sleeve on the driven member to engage the long arms of the levers and move the same against the action of said springs, and means connected with said ring to be operated by said levers for moving said ring away from said friction members.

In testimony whereof I affix my signature in the presence of two witnesses.

SAMUEL M. D. MILLER.

Witnesses:
LEWIS E. FLANDERS,
A. M. DORR.